US008204065B2

(12) United States Patent
Zancan

(10) Patent No.: US 8,204,065 B2
(45) Date of Patent: Jun. 19, 2012

(54) NETWORK ADDRESS TRANSLATION IN SESSION INITIATION PROTOCOL BASED APPLICATION

(75) Inventor: Mario Zancan, Mitcham (GB)

(73) Assignee: Avaya ECS Ltd., Hertfordshire (GB)

(*) Notice: Subject to any disclaimer, the term of this patent is extended or adjusted under 35 U.S.C. 154(b) by 1304 days.

(21) Appl. No.: 11/540,836

(22) Filed: Sep. 29, 2006

(65) Prior Publication Data

US 2008/0080510 A1 Apr. 3, 2008

(51) Int. Cl.
 *H04L 12/56* (2006.01)
 *H04J 3/16* (2006.01)
(52) U.S. Cl. ........................ 370/401; 370/469
(58) Field of Classification Search .................. 370/400, 370/410, 467; 709/227, 228
 See application file for complete search history.

(56) References Cited

U.S. PATENT DOCUMENTS

| | | | | |
|---|---|---|---|---|
| 2002/0138622 | A1* | 9/2002 | Dorenbosch et al. | 709/227 |
| 2004/0139230 | A1* | 7/2004 | Kim | 709/245 |
| 2005/0025136 | A1* | 2/2005 | Anschutz et al. | 370/352 |
| 2005/0100001 | A1* | 5/2005 | Liu | 370/352 |
| 2006/0120375 | A1* | 6/2006 | Ravikumar et al. | 370/392 |
| 2006/0215652 | A1* | 9/2006 | Strandridge et al. | 370/389 |
| 2006/0272009 | A1* | 11/2006 | Stott | 726/3 |
| 2007/0226781 | A1* | 9/2007 | Chen et al. | 726/4 |

OTHER PUBLICATIONS

J. Rosenberg, "Interactive Connectivity Establishment (ICE): A Methodology for Network Address Translator (NAT) Traversal for Offer/Answer Protocols," Jun. 26, 2006, IETF Internet Drafts, <http://tools.ietf.org/html/draft-ietf-mmusic-ice-09>.*
J. Rosenberg, "An Extension to the Session Initiation Protocol (SIP) for Symmetric Response Routing," Jan. 2003, IETF Drafts, <http://tools.ietf.org/html/draft-ietf-sip-nat-02>.*
Nadir Gaylani, "NAT Traversal and Mobility in VOIP Applications," Sep. 2005, Graduate Thesis for Atilim University, <http://www.library.atilim.edu.tr/tezler/1022448.pdf>.*

(Continued)

*Primary Examiner* — Dang Ton
*Assistant Examiner* — Ryan Kavleski
(74) *Attorney, Agent, or Firm* — Maldjian Law Group LLC; John P. Maldjian, Esq.; Alexander D. Walter, Esq.

(57) ABSTRACT

Improved techniques are disclosed for providing network address translation (NAT) in a session initiation protocol (SIP) based application. For example, a method for use in a router for performing NAT on a SIP message associated with a session being initiated between a first device and at least a second device, wherein the first device is part of a first network and the second device is part of a second network, includes the following steps. A SIP message is obtained from the first device, wherein a header field of the SIP message includes a local address and local port number usable by the first device on the first network. A port number to be associated with the session being initiated is randomly selected. The randomly selected port number is usable on the second network. An association (e.g., a binding) is generated between the randomly selected port number and a global address usable on the second network, the local address and the local port number. The local address and the local port number are substituted in the header field of the SIP message with the global address and the randomly selected port number thereby generating an address-translated SIP message. The address-translated SIP message is sent to the second device on the second network. The randomly selected port number may serve as a unique identifier for the session being initiated.

6 Claims, 4 Drawing Sheets

OTHER PUBLICATIONS

J. Rosenberg et al., "STUN—Simple Traversal of User Datagram Protocol (UDP) Through Network Address Translators (NATs)," Network Working Group, Request for Comments: 3489, Standards Track, Mar. 2003, pp. 1-47.

J. Rosenberg et al., "SIP: Session Initiation Protocol," Network Working Group, Request for Comments: 3261, Standards Track, Jun. 2002, pp. 1-269.

European Patent Application No. 07116992.4, European Communication dated Oct. 19, 2011, Avaya ECS Ltd., 2 pages.

Ma, Cathy, "CA Application No. 2,595,131 Office Action Mar. 3, 2010", , Publisher: CIPO, Published in: CA.

Ma, Cathy, "CA Application No. 2,595,131 Office Action Jan. 21, 2011", , Publisher: CIPO, Published in: CA.

* cited by examiner

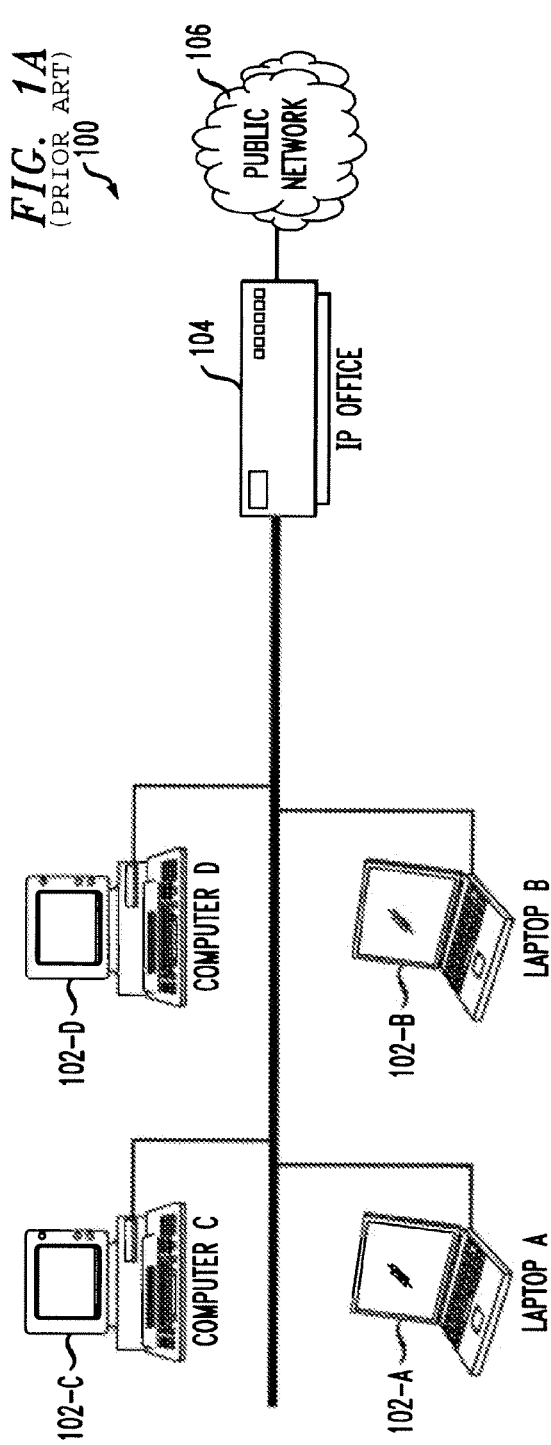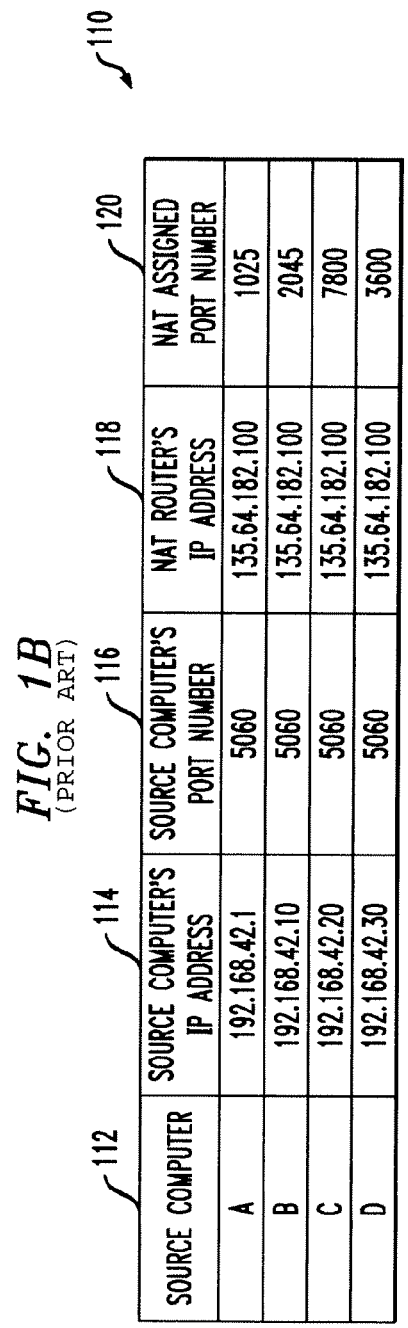
FIG. 1A (PRIOR ART)
FIG. 1B (PRIOR ART)

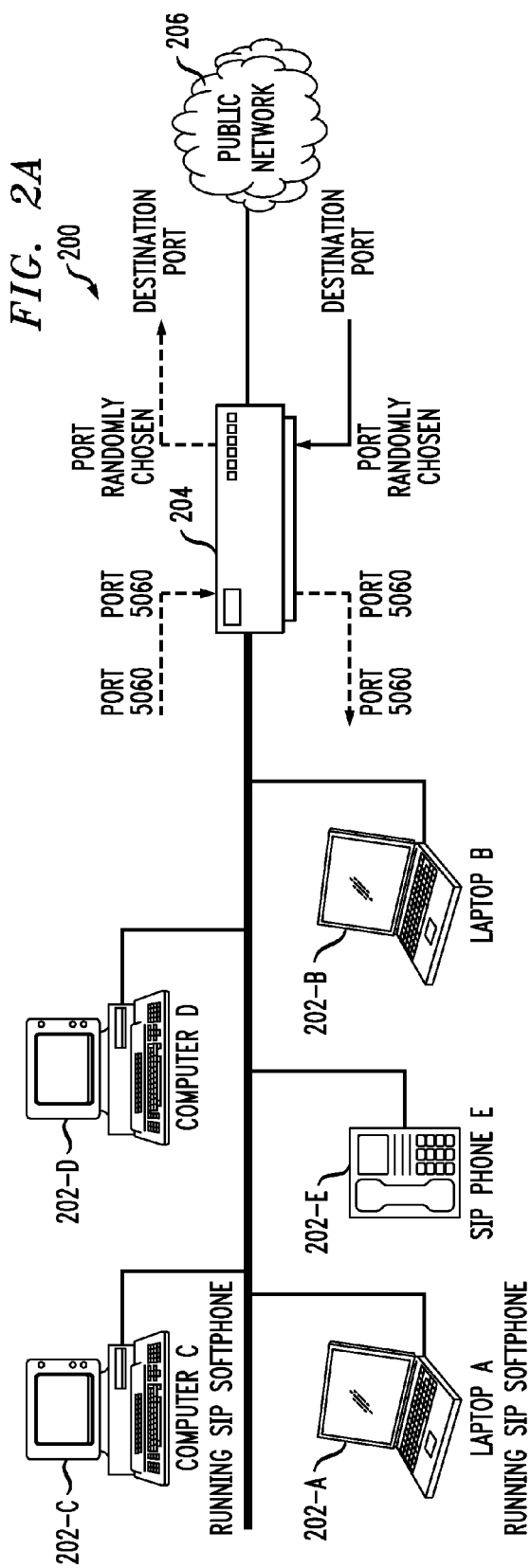

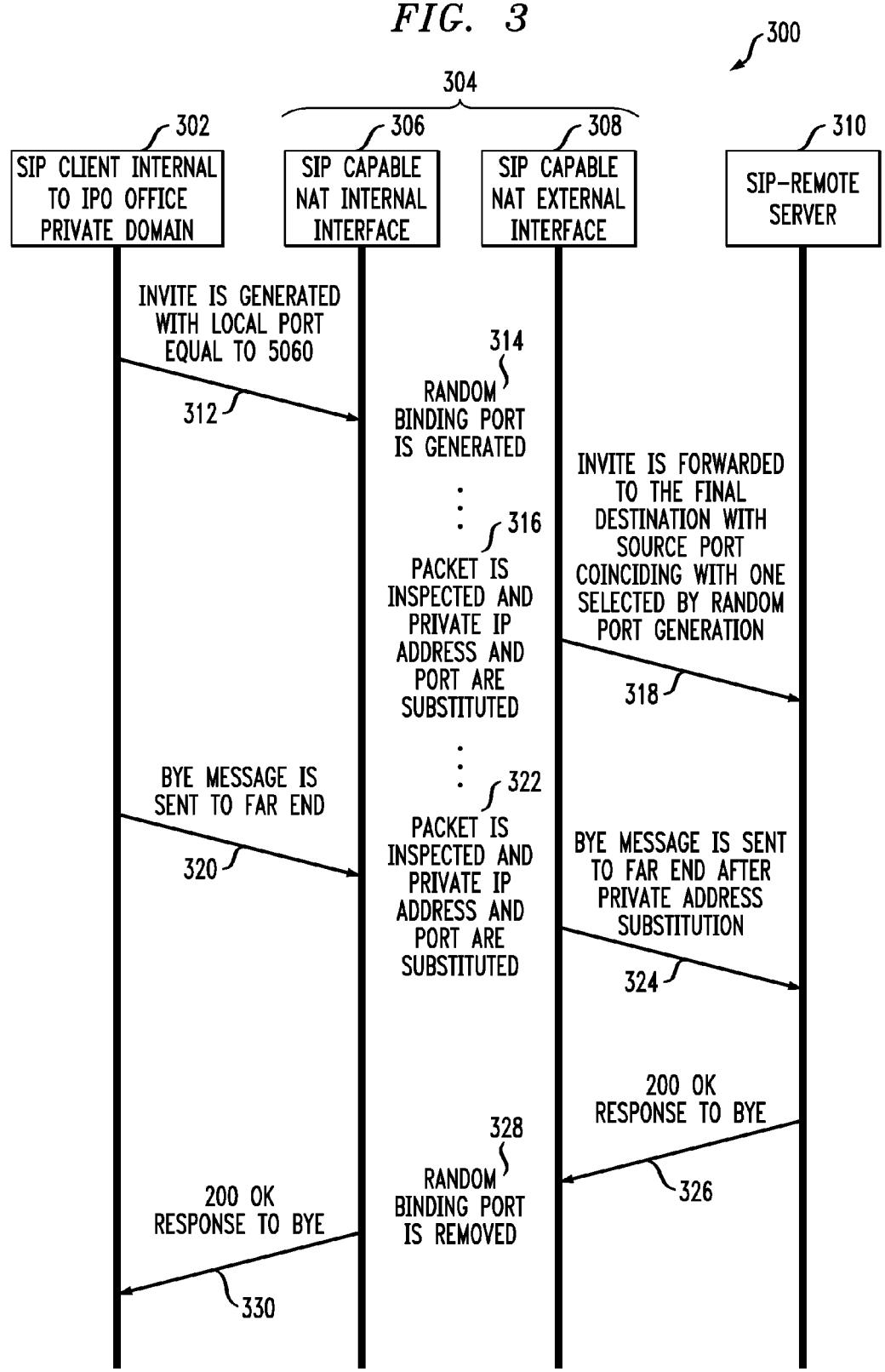

NETWORK ADDRESS TRANSLATION IN SESSION INITIATION PROTOCOL BASED APPLICATION

FIELD OF THE INVENTION

The invention relates generally to the field of multimedia communication systems, and more particularly to techniques for providing Network Address Translation (NAT) in a Session Initiation Protocol (SIP)-based application.

BACKGROUND OF THE INVENTION

The Session Initiation Protocol (SIP) is an application-level control protocol for setting up and tearing down sessions with one or more participants. Such sessions may typically involve Internet telephone calls (i.e., so-called Voice over Internet Protocol or VoIP calls) or video calls. However, SIP may be used in other applications where session initiation is required. Also, SIP is merely a signaling (control) protocol which serves to create, modify and terminate sessions, while other session protocols (e.g., Real-time Transport Protocol or RTP) are used to handle the actual transfer of the media content (e.g., voice or video data). Further, SIP acts as a carrier for the Session Description Protocol (SDP), which describes the media content of the session.

Network Address Translation (NAT) is a process that rewrites the source and/or destination addresses of Internet Protocol (IP) packets as they pass through a router or firewall to a global public IP address. The NAT process enables multiple hosts on a private network to access the Internet using the single public IP address. NAT also provides a degree of security by masking the internal private addresses from the public domain.

A fundamental problem exists between SIP applications and traditional NAT. That is, a SIP message may include one or more header fields. SIP header fields, such as "Via" and "Contact," are used to convey message attributes and modify message meaning. The header fields contain private IP addresses which are sent by a session offering device to an answering device when a session is being initiated. The SIP messages (and thus header fields) are embedded in the bodies of one or more IP packets. However, traditional NAT only translates addresses in the header of an IP packet, not in the body of an IP packet. Therefore, the private addresses in the SIP messages are not translated and are thus unroutable in the public domain. This disables the session initiation process.

There are some existing solutions to this problem. Simple Traversal of User Datagram Protocol (UDP) Through NAT or STUN is a protocol that attempts to address this problem. However, STUN does not work with symmetric NAT. With symmetric NAT, all requests from the same internal IP address and port to a specific destination IP address and port are mapped to a unique external source IP address and port. If the same internal host sends a packet with the same source address and port to a different destination, a different mapping is used. Only an external host that receives a packet can send a packet back to the internal host.

Another solution to the SIP/NAT problem that is intended to work with symmetric NAT is the Traversal Using Relay NAT or TURN protocol. However, TURN requires relaying data though a server that resides on the public Internet. This adds to the complexity and cost of initiating a session.

Accordingly, there is a need for improved techniques for providing NAT in a SIP-based application.

SUMMARY OF THE INVENTION

Principles of the present invention provide improved techniques for providing NAT in a SIP-based application.

For example, in one aspect of the invention, a method for use in a router for performing network address translation on a session initiation protocol (SIP) message associated with a session being initiated between a first device and at least a second device, wherein the first device is part of a first network and the second device is part of a second network, includes the following steps. A SIP message is obtained from the first device, wherein a header field of the SIP message includes a local address and local port number usable by the first device on the first network. A port number to be associated with the session being initiated is randomly selected. The randomly selected port number is usable on the second network. An association (e.g., a binding) is generated between the randomly selected port number and a global address usable on the second network, the local address and the local port number. The local address and the local port number are substituted in the header field of the SIP message with the global address and the randomly selected port number thereby generating an address-translated SIP message. The address-translated SIP message is sent to the second device on the second network. Advantageously, the randomly selected port number may serve as a unique identifier for the session being initiated.

Further, the method may include the step of deleting the randomly selected port number association upon termination of the session initiated by the SIP message. Also, the method may include the step of listening for a response from the second device at the randomly selected port number associated with the session. The method may also include the step of substituting a media transport protocol port number in a session description portion of the SIP message with another randomly selected port number. The SIP message is typically embedded in the body of one or more packets sent by the first device.

Still further, the session being initiated may include a voice call session or a video call session between the first device and the second device. The voice call session may be a Voice over Internet Protocol based session. Also, in one embodiment, the first network may be a private network and the second network may be a public network (e.g., Internet).

Advantageously, the SIP message processing methodology of the invention can be employed in symmetric NAT and does not require relay servers, thus overcoming the drawbacks associated with the STUN and TURN protocols.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 1A and 1B illustrate an overload NAT methodology.

FIGS. 2A and 2B illustrate a SIP-enabled NAT methodology according to an embodiment of the invention.

FIG. 3 illustrates SIP-based call signalling according to an embodiment of the invention.

DETAILED DESCRIPTION OF PREFERRED EMBODIMENTS

Figure 4:
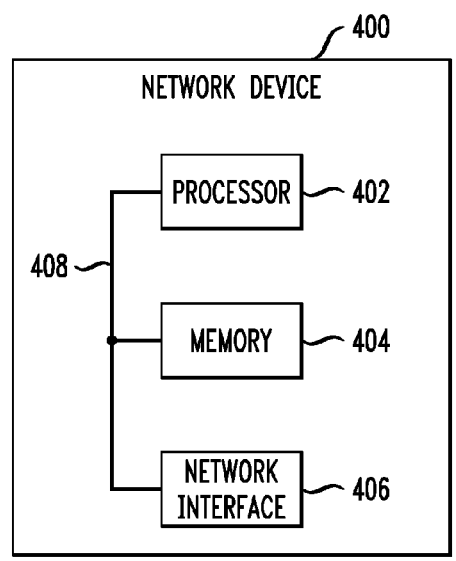
FIG. 4 illustrates a computing architecture of a device for use in implementing a SIP-enabled NAT methodology according to an embodiment of the invention.

It is to be appreciated that while the present invention will be described below in the context of IP telephony applications, the invention is not so limited. That is, the present invention is more generally applicable to any SIP-based application with which it would be desirable to implement NAT.

Principles of the invention define the operation of a Network Address Translation (NAT) process (or Network Address Translator) targeted toward SIP-based applications. As mentioned above, SIP messages have embedded IP addresses of the sender in the "Via" and "Contact" header fields. When passing from the private domain to the public domain, local addresses need to be substituted with a global address (assigned by Internet Assigned Numbers Authority or IANA). To accomplish this, a NAT process needs to be capable of identifying outgoing SIP messages and substituting all relevant fields such that the SIP messages are routable over the Internet by one or more SIP servers. Such a process also should preferably be achieved while posing no special requirements on SIP phone specifications and in a manner that is simple and cost effective. As will be seen, principles of the invention achieve these and other advantages. First, we describe a non-SIP enabled NAT process in the context of FIGS. 1A and 1B.

FIGS. 1A and 1B illustrate a so-called "overload" NAT process. In overload NAT, the NAT router/firewall uses only one global IP address, assigned to the site by IANA, and multiplexes different User Datagram Protocol (UDP) and Transport Control Protocol (TCP) sockets using their port numbers. Address substitution is limited to IP headers and does not involve the IP packet body.

Thus, FIG. 1A shows a part of a private network 100 including a plurality of network devices such as laptop computers 102-A and 102-B, and desktop computers 102-C and 102-D. The network devices are coupled to NAT router 104, which serves as a firewall between the private network and public network (Internet) 106. While the invention is not limited to any particular private network configuration, it is to be appreciated that such configuration could be part of a private corporate network.

Binding table 110 in FIG. 1B illustrates how router 104 performs NAT. Column 112 identifies the source computers A through D, respectively corresponding to network devices 102-A through 102-D. Column 114 identifies the unique private (local) IP address of each source computer. Column 116 identifies the port number of each source computer, which as shown is the same for each source computer. Column 118 identifies the NAT router's public IP address, i.e., the global IP address that is used as a substitute for the local IP addresses of the source computers. Column 120 identifies the NAT assigned port address statically set for each of the source computers. Thus, in the overload NAT approach illustrated in FIG. 1B, each local private address (i.e., 192.168.42.1; 192.168.42.10, etc.) uses the same public IP address (i.e., 135.64.182.100), and the various data streams of the source computers are multiplexed using fixed port numbers (i.e., 1025, 2045, etc.).

Unfortunately, as mentioned above, if the NAT approach shown in FIG. 1B were used for SIP-based applications, SIP messages would be sent using invalid "Via" and "Contact" headers, containing local addresses that would be unroutable in the public domain. Principles of the invention, as illustratively depicted in FIGS. 2A and 2B, provide a solution to this problem.

Accordingly, FIGS. 2A and 2B illustrates a SIP-enabled NAT methodology according to an embodiment of the invention. The SIP-enabled NAT methodology enables the NAT router to parse SIP request messages and provides security against intrusion on listening ports.

Thus, FIG. 2A shows a part of a private network 200 including a plurality of network devices, some of which are SIP-enabled devices, i.e., devices that are capable of running SIP-based applications such as a VoIP call participation. Thus, as shown, network 200 includes laptop computer 202-A running a SIP softphone, laptop computer 202-B, desktop computer 202-C running a SIP softphone, desktop computer 202-D and SIP phone 202-E. The network devices are coupled to NAT router 204, which serves as a firewall between the private network and public network (Internet) 206. Again, while the invention is not limited to any particular private network configuration, it is to be appreciated that such configuration could be part of a private corporate network.

Binding table 210 in FIG. 2B illustrates how router 204 performs NAT according to an embodiment of the invention. Column 212 identifies the source computers A through E, respectively corresponding to network devices 202-A through 202-E. Column 214 identifies the unique private (local) IP address of each source computer. Column 216 identifies the port number of each source computer, which as shown is the same for each source computer. Column 218 identifies the NAT router's public IP address, i.e., the global IP address that is used as a substitute for the local IP addresses of the source computers. Column 220 identifies a NAT assigned port address randomly chosen by router 204 for each of the source computers (e.g., randomly chosen between 1024 and 65535). Thus, advantageously, the NAT router recognizes a SIP request and creates a binding (such as the binding that each row of table 210 represents) between the private source address (column 214), the global IP address of the router (column 218) and the randomly selected port number (column 220) that is chosen to be the source port number to be sent over the Internet.

It is to be understood that the term "binding" generally refers to a correspondence or association generated or established between two or more elements. For example, each row in tabular data structure 210 is considered a binding wherein the column elements (local address and port, and global address and port) in a row are relationally associated with one another.

Advantageously, using the SIP-enabled NAT methodology of the invention, such randomly chosen port number will appear in the "Via" and "Contact" headers embedded in the bodies of IP packets and will substitute the original default port number (5060). The global IP address will substitute the address of the sender in the private domain. SIP-enabled NAT router 204 will then listen for responses to the request sent at the randomly chosen port number reserved to that particular dialog session.

Such binding will remain active for the entire SIP session and, at the expiration of the session, the binding will be destroyed (removed or deleted). Destruction of the binding serves as a security mechanism to prevent active ports from being advertised outside the dialog in which they are involved. Accordingly, as a result of the randomly selected port number, each dialog has a separate randomly chosen identifier, such that termination of one dialog will not affect another dialog.

For example, in one embodiment, the entries of binding table 210 are deleted in the following cases:

(1) when a BYE Request (i.e., a request method of SIP that terminates a call) is received, after having sent a 200 OK (i.e., a response code of SIP);

(2) when a BYE Request is sent, after having received a 481 or 408 Response (i.e., response codes of SIP), or after a client transaction timeout;

(3) when a CANCEL Request (i.e., a request method of SIP that cancels searches and "ringing") is sent, after 200 and 487 Responses (i.e., response codes of SIP) are received; or (4) when a CANCEL Request is received, if an ACK Request (a request method for SIP that confirms a final response for the INVITE Request) is received after having sent a 487 Response.

Advantageously, the above-described NAT process uses randomly selected port numbers to uniquely identify different SIP ongoing dialogs. Such randomly selected port number and the global IP address are the values that substitute the private port number and the private IP address in each SIP request sent by NAT router 204 over the Internet. The binding of local and global IP addresses based on SIP transactions, such as the presence of a NAT entry during a SIP session, is guaranteed independent of the transport protocol (e.g., UDP, TCP).

FIG. 3 illustrates an example of SIP-based call signalling using SIP-enabled NAT according to an embodiment of the invention. As shown, process 300 involves SIP client 302 which is part of the private network (e.g., 202-A in FIG. 2A), SIP-enabled router 304 (e.g., NAT router 204 in FIG. 2A) which includes an internal interface 306 and an external interface 308 where "internal" and "external" are from the perspective of the private network, and a SIP-remote server 310 which is located in the public (Internet) domain (e.g., 206 in FIG. 2A).

In step 312, SIP client 302 generates an INVITE Request with a local port equal to 5060 (i.e., default port address shown in column 216 of FIG. 2B). This message is sent to NAT router 304.

In step 314, NAT router 304 generates a random port binding (e.g., for source computer 202-A in FIG. 2A, the binding represented by the first row of table 210 in FIG. 2B).

In step 316, the one or more packets that constitute the INVITE Request are inspected by the NAT router, and the private IP address and port are respectively substituted with the global IP address and randomly selected port, as per the generated binding.

In step 318, the translated INVITE Request is then forwarded to the final destination, i.e., SIP-remote server 310.

Assuming a call was setup and occurred between SIP client 302 and SIP-remote server 310, the SIP client in step 320 sends a BYE Request message to terminate the call. The packets in the BYE message are subjected to the same translation in step 322 as the packets in step 316, i.e., they are translated using the same port number randomly selected for the binding generated in step 314. The translated BYE message is then forwarded to SIP-remote server 310 in step 324.

The remote server, in step 326, then sends a 200 OK response to NAT router 304. In step 328, the NAT router deletes the binding for that dialog and forwards the 200 OK response to the SIP client in step 330, thus ending the call.

It is to be appreciated that while the random port generation process of the invention is illustrated above for use in translating header fields (e.g., Via and Contact header fields) in a SIP message, the random port generation process can be applied to translation of other port numbers in the SIP message. For example, the process can be applied to the RTP port number in the SDP portion of a SIP message. It is to be understood that the SDP portion describes the session to be initiated. The IP address for the SDP portion of the SIP message will be the same as that for the signalling portion (i.e., header fields).

Turning now to FIG. 4, a computing architecture 400 of a network device for use in implementing a SIP-enabled NAT methodology, according to an embodiment of the invention, is illustrated. That is, FIG. 4 may be considered a computing architecture used to implement NAT router 204 as shown in FIG. 2A. The computing architecture may also represent a SIP client and/or a SIP-remote server (FIG. 3). However, it is to be understood that the invention is not limited to any particular computing system implementation.

In this illustrative implementation, a processor 402 for implementing at least a portion of the methodologies of the invention is operatively coupled to a memory 404 and a network interface 406 via a bus 408, or an alternative connection arrangement.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

Further, the phrase "network interface" as used herein is intended to include, for example, one or more devices capable of allowing the computing system 400 to communicate with other computing systems. Thus, the network interface may comprise a transceiver configured to communicate with a transceiver of another computer system via a suitable communication protocol.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 402.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   receiving, at a first device, a Session Initiation Protocol (SIP) message from a second device, wherein:
   (i) the first device comprises a first interface and a second interface, wherein the first interface connects the first device with a first local area network and the second interface connects the first device with a second network,
   (ii) the first device connects the first local area network to the second network, (iii) a header field of the Session Initiation Protocol (SIP) message comprises a local address and a local port number usable by the first device on the first local area network,
(iv) the Session Initiation Protocol (SIP) message comprises a Session Description Protocol (SDP) portion, wherein the Session Description Protocol (SDP) portion identifies a Real-Time Protocol (RTP) port number, and
(v) the Session Initiation Protocol (SIP) message is used to set up a communication session between the second device and a third device, wherein the second device is part of the first local area network and the third device is part of the second network;

in response to the receipt of the Session Initiation Protocol (SIP) message, randomly selecting, at the first device, a first port number and a second port number;

associating, at the first device, the first port number and a global address usable on the second network with the local address and the local port number;

associating, at the first device, the second port number Real-Time Protocol (RTP) port number;

substituting, at the first device, the local address and the local port number in the header field of the Session Initiation Protocol (SIP) message with the global address and the first port number;

substituting, at the first device, the Real-Time Protocol (RTP) port number in the Session Description Protocol (SDP) portion of the Session Initiation Protocol (SIP) message with the second port number; and transmitting, from the first device, the Session Initiation Protocol (SIP) message to the third device.

2. The method of claim 1, further comprising the step of listening for a response from the third device at the randomly selected port number.

3. The method of claim 1, wherein the Session Initiation Protocol (SIP) message is embedded in the body of one or more packets sent by the first device.

4. The method of claim 1, wherein the Session Initiation Protocol (SIP) message is used to initiate a video call session or a voice call session between the second device and the third device.

5. The method of claim 4, wherein the voice call session is a Voice over Internet Protocol based session.

6. The method of claim 1, wherein the first local area network is a private network and the second network is a public network.

* * * * *